(12) United States Patent
Park et al.

(10) Patent No.: US 11,521,250 B2
(45) Date of Patent: Dec. 6, 2022

(54) METHOD AND APPARATUS FOR PROVIDING DIGITAL PRODUCT USING USER ACCOUNT SYNCHRONIZATION

(71) Applicant: N-TUPLE.CO.LTD, Seoul (KR)

(72) Inventors: Hyun-Min Park, Seoul (KR); Ho-Gyu Lee, Seoul (KR)

(73) Assignee: N-TUPLE.CO.LTD, Seou (KR)

( * ) Notice: Subject to any disclaimer, the term of this patent is extended or adjusted under 35 U.S.C. 154(b) by 195 days.

(21) Appl. No.: 15/763,001

(22) PCT Filed: Sep. 22, 2016

(86) PCT No.: PCT/KR2016/010557
§ 371 (c)(1),
(2) Date: Mar. 23, 2018

(87) PCT Pub. No.: WO2017/052210
PCT Pub. Date: Mar. 30, 2017

(65) Prior Publication Data
US 2018/0218419 A1     Aug. 2, 2018

(30) Foreign Application Priority Data

Sep. 23, 2015   (KR) .......................... 10-2015-0134592

(51) Int. Cl.
G06Q 30/00    (2012.01)
G06Q 30/06    (2012.01)
H04L 9/40     (2022.01)

(52) U.S. Cl.
CPC ..... *G06Q 30/0609* (2013.01); *H04L 63/0884* (2013.01); *H04L 63/083* (2013.01)

(58) Field of Classification Search
CPC ............ G06Q 30/0609; H04L 63/0884; H04L 63/083
See application file for complete search history.

(56) References Cited

U.S. PATENT DOCUMENTS 7,137,006 B1 * 11/2006 Grandcolas ............. G06F 21/41
                                                    713/180
8,453,225 B2 *  5/2013 Agarwal ............. H04L 63/0815
                                                    726/8
(Continued)

FOREIGN PATENT DOCUMENTS

KR    10-2005-0093466 A    9/2005
KR    10-2010-0127323 A    12/2010
(Continued)

OTHER PUBLICATIONS

"Agent based infrastructure for real time applications," by Grzegorz Orynczak and Zbigniew Kotulski, Annales UMCS Informatica AI XI, 4 (2011)33-47 (Year: 2011).*

*Primary Examiner* — Anne M Georgalas
(74) *Attorney, Agent, or Firm* — Novick, Kim & Lee PLLC; Jae Youn Kim (57) ABSTRACT

A method for providing a digital product according to the present invention comprises the steps of: receiving a request to provide a digital product of a digital product providing server from a terminal of a user; obtaining a login server user identifier of the user for a unique application identifier by logging in to a login server using the unique application identifier; storing digital product providing information in a database in association with the login server user identifier on the basis of the request to provide the digital product of the digital product providing server; and transmitting the digital product providing information to the digital product providing server in association with the login server user identifier, thereby being able to conveniently provide the digital product by synchronizing a user account.

6 Claims, 5 Drawing Sheets

(56) References Cited

U.S. PATENT DOCUMENTS

| | | | | |
|---|---|---|---|---|
| 9,361,606 | B2* | 6/2016 | Hertel | G06Q 30/0222 |
| 9,418,216 | B2* | 8/2016 | Wetter | H04L 63/0853 |
| 10,027,556 | B2* | 7/2018 | Krywaniuk | H04L 41/24 |
| 10,055,598 | B2* | 8/2018 | Miller | H04L 65/612 |
| 10,701,148 | B2* | 6/2020 | Varney | H04L 41/50 |
| 2002/0019943 | A1* | 2/2002 | Cho | G06F 21/10 |
| | | | | 713/193 |
| 2002/0099663 | A1* | 7/2002 | Yoshino | G06Q 30/06 |
| | | | | 705/65 |
| 2003/0093694 | A1* | 5/2003 | Medvinsky | H04L 63/062 |
| | | | | 726/6 |
| 2004/0139207 | A1* | 7/2004 | de Jong | G06F 21/10 |
| | | | | 709/229 |
| 2006/0206932 | A1* | 9/2006 | Chong | H04L 67/02 |
| | | | | 726/10 |
| 2010/0293049 | A1* | 11/2010 | Maher | G06Q 30/02 |
| | | | | 705/14.46 |
| 2011/0010541 | A1* | 1/2011 | Robert | G06F 21/10 |
| | | | | 713/162 |
| 2012/0001490 | A1* | 1/2012 | Lee | H02J 3/14 |
| | | | | 307/80 |
| 2012/0331088 | A1* | 12/2012 | O'Hare | H04L 67/1097 |
| | | | | 709/214 |
| 2015/0172261 | A1* | 6/2015 | Counterman | H04L 63/0815 |
| | | | | 726/7 |
| 2015/0281350 | A1* | 10/2015 | Toksoz | H04L 67/1095 |
| | | | | 709/248 |
| 2016/0021089 | A1* | 1/2016 | Adams | H04L 67/306 |
| | | | | 726/9 |

FOREIGN PATENT DOCUMENTS

| | | |
|---|---|---|
| KR | 10-2012-0020501 A | 3/2012 |
| KR | 10-2013-0030863 A | 3/2013 |
| KR | 10-2014-0126850 A | 11/2014 |
| KR | 10-2015-0065441 A | 6/2015 |
| WO | 2011/037359 A2 | 3/2011 |

* cited by examiner

METHOD AND APPARATUS FOR PROVIDING DIGITAL PRODUCT USING USER ACCOUNT SYNCHRONIZATION

TECHNICAL FIELD

The present invention relates to a method and apparatus for providing a digital product using user account synchronization.

BACKGROUND ART

A user may use various kinds of digital product providing services owing to development of information communication techniques, and accordingly, there are many cases in which a service like a cross promotion provides digital products of other services. Accordingly, a technique capable of providing digital products of other services by a service more conveniently is required.

DISCLOSURE OF INVENTION

Technical Problem

The present invention has been made in view of the above problems, and it is an object of the present invention to provide a method and apparatus for conveniently providing a digital product by synchronizing a user account using a third-party login server.

Technical Solution

To accomplish the above object, according to one aspect of the present invention, there is provided a digital product providing method executed by a digital product providing information management server, the method comprising the steps of: receiving a request for providing a digital product of a digital product providing server from a terminal of a user; logging into a login server using a unique application identifier and obtaining a login server user identifier of the user for the unique application identifier; storing digital product providing information in a database in association with the login server user identifier on the basis of the request for providing a digital product of the digital product providing server; and transmitting the digital product providing information to the digital product providing server in association with the login server user identifier.

Preferably, the step of transmitting the digital product providing information to the digital product providing server in association with the login server user identifier includes the step of transmitting the digital product providing information to the digital product providing server together with the login server user identifier.

Preferably, the step of transmitting the digital product providing information to the digital product providing server in association with the login server user identifier includes the steps of: receiving a digital product providing information request from the digital product providing server, wherein the digital product providing information request includes the login server user identifier; and searching for digital product providing information related to the login server user identifier from the database and transmitting the digital product providing information to the digital product providing server.

Preferably, the step of transmitting the digital product providing information to the digital product providing server in association with the login server user identifier includes the step of transmitting the digital product providing information to the digital product providing server together with a local user identifier corresponding to the login server user identifier.

Preferably, the step of transmitting the digital product providing information to the digital product providing server in association with the login server user identifier includes the steps of: receiving a digital product providing information request from the digital product providing server, wherein the digital product providing information request includes a local user identifier corresponding to the login server user identifier; and searching for digital product providing information related to the local user identifier from the database and transmitting the digital product providing information to the digital product providing server.

Preferably, the digital product providing method further comprises the step of receiving account synchronization information from the digital product providing server, wherein the account synchronization information includes the login server user identifier and an internal user identifier of the digital product providing server corresponding to the login server user identifier, and the local user identifier corresponding to the login server user identifier is the internal user identifier of the digital product providing server.

Preferably, the digital product providing method further comprises the step of transmitting account synchronization information to the digital product providing server, wherein the account synchronization information includes the login server user identifier and an internal user identifier of the digital product providing information management server corresponding to the login server user identifier, and the local user identifier corresponding to the login server user identifier is the internal user identifier of the digital product providing information management server.

Preferably, the digital product providing information request includes an identifier for a service of the digital product providing server.

Preferably, the digital product providing information management server and the digital product providing server are operated by different companies.

According to another aspect of the present invention, there is provided a digital product providing method executed by a digital product providing information management server, the method comprising the steps of: receiving a request for providing a digital product of a second digital product providing server from a first digital product providing server, wherein the request for providing a digital product of the second digital product providing server includes a login server user identifier for a unique application identifier or a first local user identifier corresponding to the login server user identifier; storing digital product providing information of the second digital product providing server in a database in association with the login server user identifier on the basis of the request for providing a digital product of the second digital product providing server; and transmitting the digital product providing information to the second digital product providing server in association with the login server user identifier.

Preferably, the digital product providing method further comprises the step of: receiving account synchronization information from the first digital product providing server, wherein the account synchronization information includes the login server user identifier and an internal user identifier of the first digital product providing server corresponding to the login server user identifier, and the first local user identifier corresponding to the login server user identifier is the internal user identifier of the first digital product providing server; or transmitting account synchronization information to the first digital product providing server, wherein the account synchronization information includes the login server user identifier and an internal user identifier of the digital product providing information management server corresponding to the login server user identifier, and the first local user identifier corresponding to the login server user identifier is the internal user identifier of the digital product providing information management server.

Preferably, the step of transmitting the digital product providing information to the second digital product providing server in association with the login server user identifier includes the step of transmitting the digital product providing information to the second digital product providing server together with the login server user identifier or a second local user identifier corresponding to the login server user identifier.

Preferably, the step of transmitting the digital product providing information to the second digital product providing server in association with the login server user identifier includes the steps of: receiving a digital product providing information request from the second digital product providing server, wherein the digital product providing information request includes the login server user identifier or a second local user identifier corresponding to the login server user identifier; and searching for digital product providing information related to the user identifier included in the digital product providing information request from the database and transmitting the digital product providing information to the digital product providing server.

Preferably, the digital product providing information request includes an identifier for a service of the second digital product providing server.

Preferably, the digital product providing method further comprises the step of: receiving account synchronization information from the second digital product providing server, wherein the account synchronization information includes the login server user identifier and an internal user identifier of the second digital product providing server corresponding to the login server user identifier, and the second local user identifier corresponding to the login server user identifier is the internal user identifier of the second digital product providing server; or transmitting account synchronization information to the second digital product providing server, wherein the account synchronization information includes the login server user identifier and an internal user identifier of the digital product providing information management server corresponding to the login server user identifier, and the second local user identifier corresponding to the login server user identifier is the internal user identifier of the digital product providing information management server.

Preferably, the first digital product providing server and the second digital product providing server are operated by different companies.

According to another aspect of the present invention, there is provided a digital product providing method executed by a digital product providing server, the method comprising the steps of: receiving an account synchronization request from a terminal of a user; logging into a login server using a unique application identifier and obtaining a login server user identifier of the user for the unique application identifier; receiving digital product providing information from a digital product providing information management server in association with the login server user identifier; and performing a digital product providing process for the user according to the digital product providing information.

Preferably, the step of receiving digital product providing information from the digital product providing information management server in association with the login server user identifier includes the step of receiving the digital product providing information from the digital product providing information management server together with the login server user identifier or a local user identifier corresponding to the login server user identifier.

Preferably, the step of receiving digital product providing information from the digital product providing information management server in association with the login server user identifier includes the steps of: transmitting a digital product providing information request to the digital product providing information management server, wherein the digital product providing information request includes the login server user identifier or a local user identifier corresponding to the login server user identifier; and receiving digital product providing information related to the login server user identifier from the digital product providing information management server.

Preferably, the digital product providing method further comprises the step of: transmitting account synchronization information to the digital product providing information management server, wherein the account synchronization information includes the login server user identifier and an internal user identifier of the digital product providing server corresponding to the login server user identifier, and the local user identifier corresponding to the login server user identifier is the internal user identifier of the digital product providing server; or receiving account synchronization information from the digital product providing information management server, wherein the account synchronization information includes the login server user identifier and an internal user identifier of the digital product providing information management server corresponding to the login server user identifier, and the local user identifier corresponding to the login server user identifier is the internal user identifier of the digital product providing information management server.

Preferably, the digital product providing information management server and the digital product providing server are operated by different companies.

Preferably, the digital product providing information request includes an identifier for a service of the digital product providing server.

According to another aspect of the present invention, there is provided a digital product receiving method executed by a user terminal, the method comprising the steps of: transmitting a request for providing a digital product of a digital product providing server to a digital product providing information management server; logging into a login server for the digital product providing information management server using a unique application identifier; transmitting an account synchronization request to the digital product providing server; logging into the login server for the digital product providing server using the unique application identifier; and receiving a digital product corresponding to the request for providing a digital product of the digital product providing server from the digital product providing server.

According to another aspect of the present invention, there is provided a digital product receiving method executed by a user terminal, the method comprising the steps of: transmitting a request for providing a digital product of a second digital product providing server to a first digital product providing server; logging into a login server for the first digital product providing server using a unique application identifier; transmitting an account synchronization request to the second digital product providing server; logging into the login server for the second digital product providing server using the unique application identifier; and receiving a digital product corresponding to the request for providing a digital product of the second digital product providing server from the second digital product providing server.

According to another aspect of the present invention, there is provided a digital product providing information management server comprising: a communication unit for transmitting and receiving data; and a control unit for receiving a request for providing a digital product of a digital product providing server from a terminal of a user through the communication unit, logging into a login server using a unique application identifier and obtaining a login server user identifier of the user for the unique application identifier through the communication unit, storing digital product providing information in a database in association with the login server user identifier on the basis of the request for providing a digital product of the digital product providing server, and transmitting the digital product providing information to the digital product providing server in association with the login server user identifier through the communication unit.

According to another aspect of the present invention, there is provided a digital product providing information management server comprising: a communication unit for transmitting and receiving data; and a control unit for receiving a request for providing a digital product of a second digital product providing server from a first digital product providing server through the communication unit, wherein the request for providing a digital product of the second digital product providing server includes a login server user identifier for a unique application identifier or a first local user identifier corresponding to the login server user identifier, storing digital product providing information of the second digital product providing server in a database in association with the login server user identifier on the basis of the request for providing a digital product of the second digital product providing server, and transmitting the digital product providing information to the second digital product providing server in association with the login server user identifier through the communication unit.

According to another aspect of the present invention, there is provided a digital product providing server comprising: a communication unit for transmitting and receiving data; and a control unit for receiving an account synchronization request from a terminal of a user through the communication unit, logging into a login server using a unique application identifier and obtaining a login server user identifier of the user for the unique application identifier through the communication unit, receiving digital product providing information from a digital product providing information management server in association with the login server user identifier through the communication unit, and performing a digital product providing process for the user according to the digital product providing information.

According to another aspect of the present invention, there is provided a user terminal comprising: a communication unit for transmitting and receiving data; and a control unit for transmitting a request for providing a digital product of a digital product providing server to a digital product providing information management server through the communication unit, logging into a login server for the digital product providing information management server using a unique application identifier through the communication unit, transmitting an account synchronization request to the digital product providing server through the communication unit, logging into the login server for the digital product providing server using the unique application identifier through the communication unit, and receiving a digital product corresponding to the request for providing a digital product of the digital product providing server from the digital product providing server through the communication unit.

According to another aspect of the present invention, there is provided a user terminal comprising: a communication unit for transmitting and receiving data; and a control unit for transmitting a request for providing a digital product of a second digital product providing server to a first digital product providing server through the communication unit, logging into a login server for the first digital product providing server using a unique application identifier through the communication unit, transmitting an account synchronization request to the second digital product providing server through the communication unit, logging into the login server for the second digital product providing server using the unique application identifier through the communication unit, and receiving a digital product corresponding to the request for providing a digital product of the second digital product providing server from the second digital product providing server through the communication unit.

The present invention includes a computer program stored in a medium to execute a method according to an embodiment of the present invention in a computer.

The present invention includes a computer-readable recording medium for storing a program which executes a method according to an embodiment of the present invention.

BEST MODE FOR CARRYING OUT THE INVENTION

Hereafter, preferred embodiments of the present invention will be described in detail with reference to the accompanying drawings to make the spirit of the present invention clear. In describing the present invention, when it is determined that the detailed description of the known art related to the present invention may obscure the gist of the present invention, the detailed description thereof will be omitted. Wherever possible, the same reference numerals and symbols are assigned to the components having practically the same functional configuration in the drawings although they are shown in different drawings. For the convenience of explanation, the apparatus and the method will be described together if needed.

Figure 1:
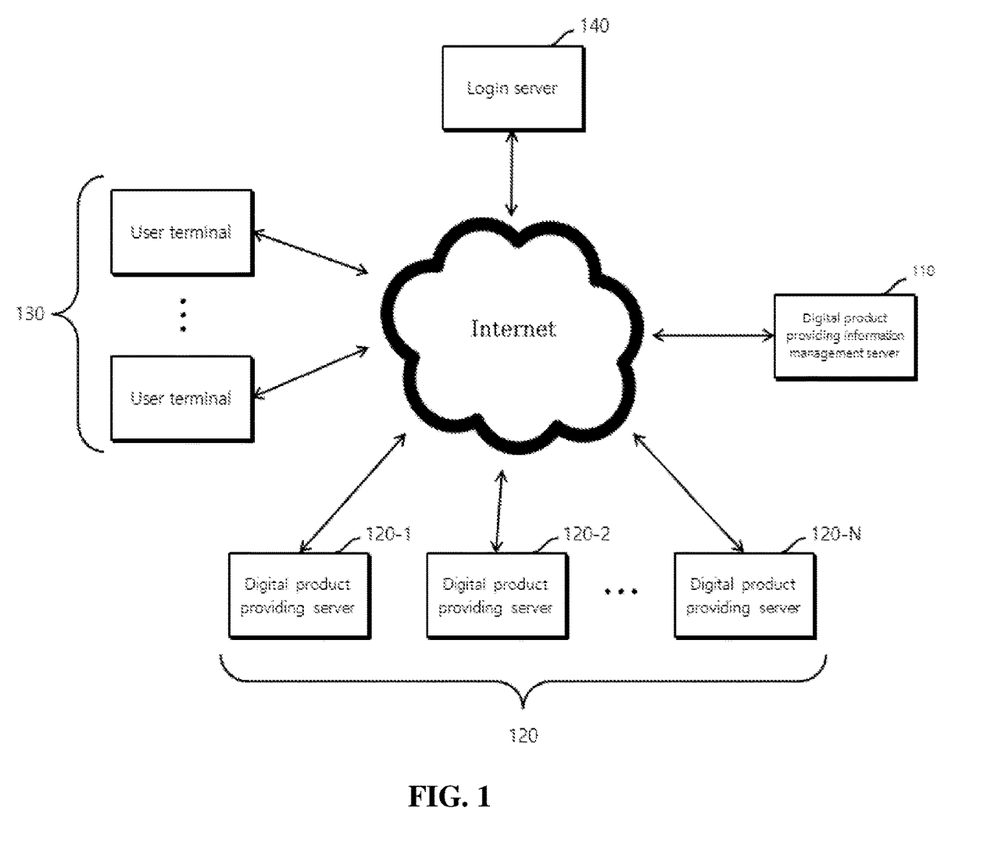
FIG. 1 is a view schematically showing the configuration of a digital product providing system according to an embodiment of the present invention.

FIG. 1 is a view schematically showing the configuration of a digital product providing system according to an embodiment of the present invention. Referring to FIG. 1, a digital product providing system according to an embodiment of the present invention includes a digital product providing information management server 110, a digital product providing server 120, a user terminal 130 and a login server 140 capable of communicating with each other. For the convenience of explanation, it is assumed that each server corresponds to one service.

The digital product providing information management server 110 is a server performing a service of managing information for providing a user with a digital product, and the digital product providing server 120 is a server directly providing a user with a digital product. Here, the digital product may include a digital subscription, a discount coupon, a free delivery coupon and the like, as well as various digital contents such as a digital medium, an electronic book, a game item and the like. In the case of the digital product providing server 120, reference numerals such as 120-1, 120-2 and the like will be used when different servers (i.e., different services) should be distinguished from each other.

The login server 140 is a server performing a login service. The login service is a service for providing a login function to another service (i.e., another server) using its own user account information, and although there is a social login service provided by a social network service such as Facebook or Tweeter as a representative example, the login service in the present invention is not limited to the social login service.

The user terminal 130 is a terminal of a user using a service provided by the servers described above and includes a mobile device such as a general computer or a smart phone.

Figure 2:
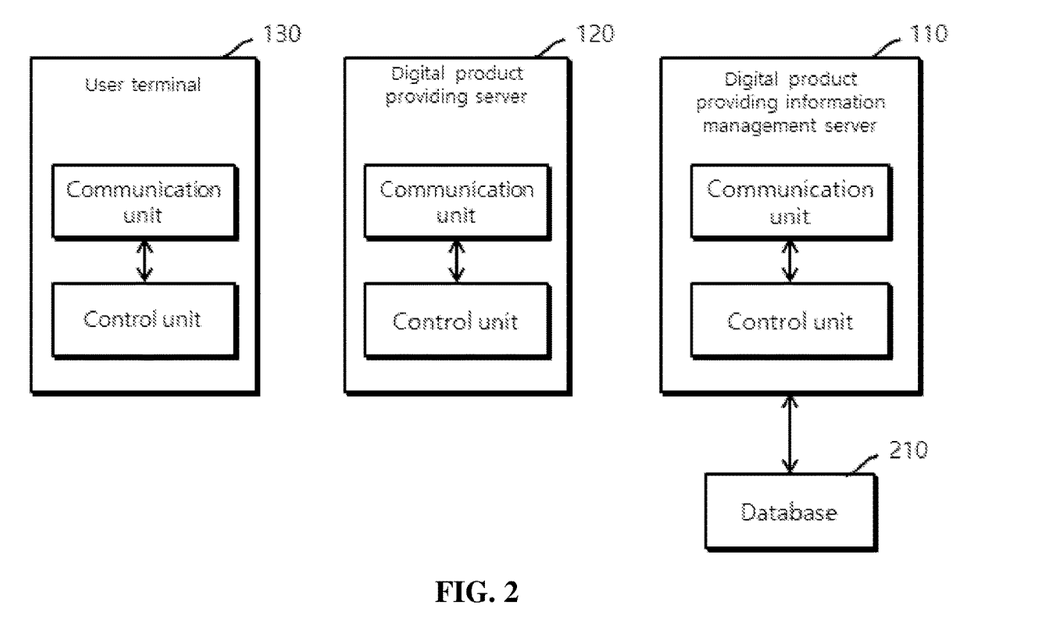
FIG. 2 is a view schematically showing the internal configuration each device of FIG. 1.

FIG. 2 is a view schematically showing the internal configuration each device of FIG. 1. Referring to FIG. 2, each of the digital product providing information management server 110, the digital product providing server 120 and the user terminal 130 may be provided with a communication unit for transmitting and receiving data and a control unit for processing the data transmitted and received through the communication unit. The digital product providing information management server 110 manages digital product providing information using a database 210, and the database 210 may be included in the digital product providing information management server 110 according to embodiments. Hereinafter, specific operation of each control unit will be described with reference to FIG. 3.

Figure 3:
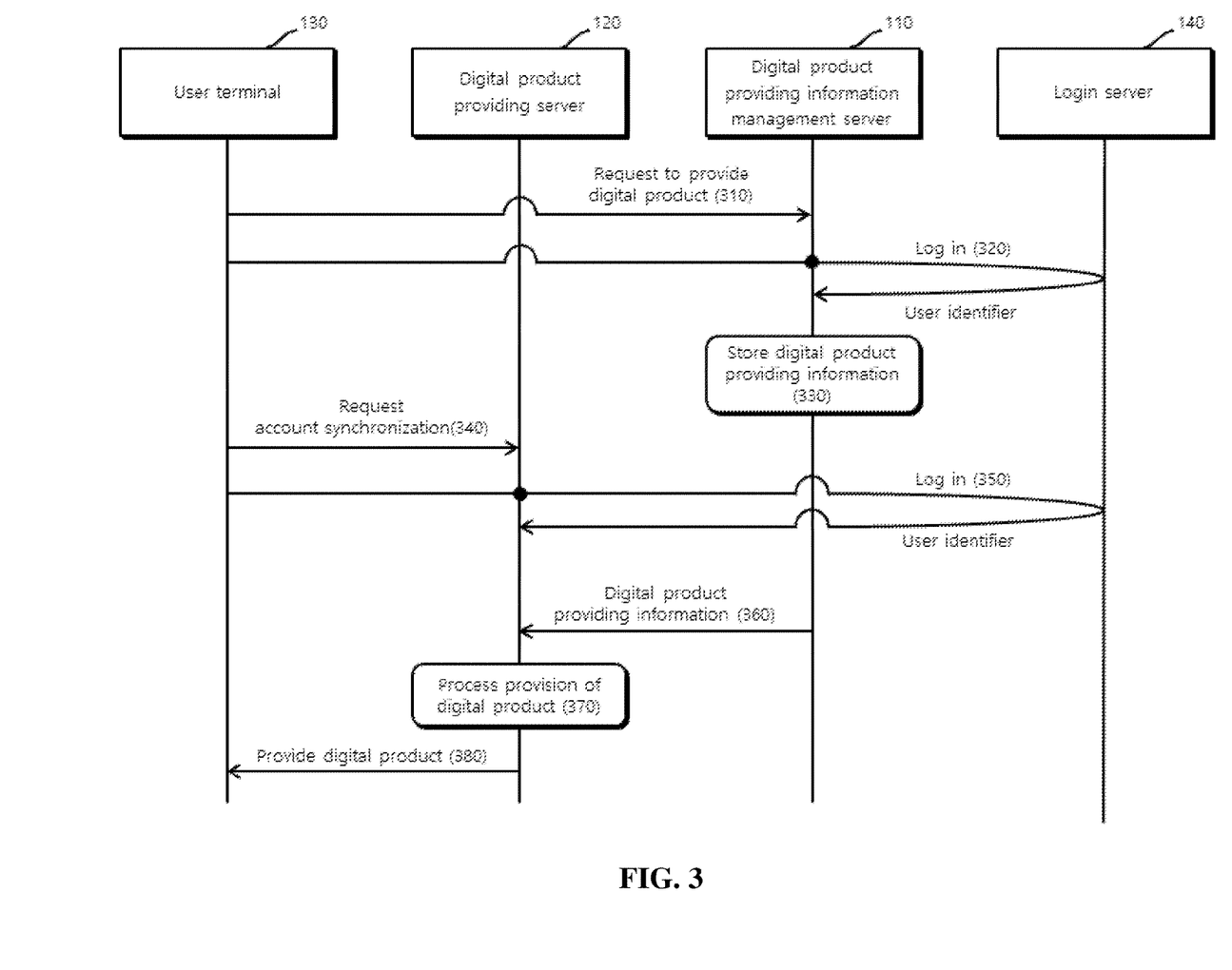
FIG. 3 is a sequence diagram illustrating the flow of a digital product providing method according to an embodiment of the present invention.

FIG. 3 is a sequence diagram illustrating a digital product providing method according to an embodiment of the present invention, and it shows a process of providing a digital product requested by a user from the digital product providing information management server 110 (e.g., purchased from the digital product providing information management server), by the digital product providing server 120, which is another server. Referring to FIG. 3, the user transmits a request for providing a digital product of the digital product providing server 120 to the digital product providing information management server 110 through the user terminal 130 (step 310). Here, the digital product is not a product directly provided by the digital product providing information management server 110, but a product provided by the digital product providing server 120, and the digital product providing information management server 110 stores the information requested by the user and provides the information to the digital product providing server 120 later or immediately. In addition, here, the request for providing a digital product of the digital product providing server 120 may be a direct request for providing a specific digital product of the digital product providing server 120 or information corresponding to provision of the specific digital product of the digital product providing server 120, in other words, information provided to the digital product providing information management server 110 to receive the specific digital product of the digital product providing server 120.

Figure 4:
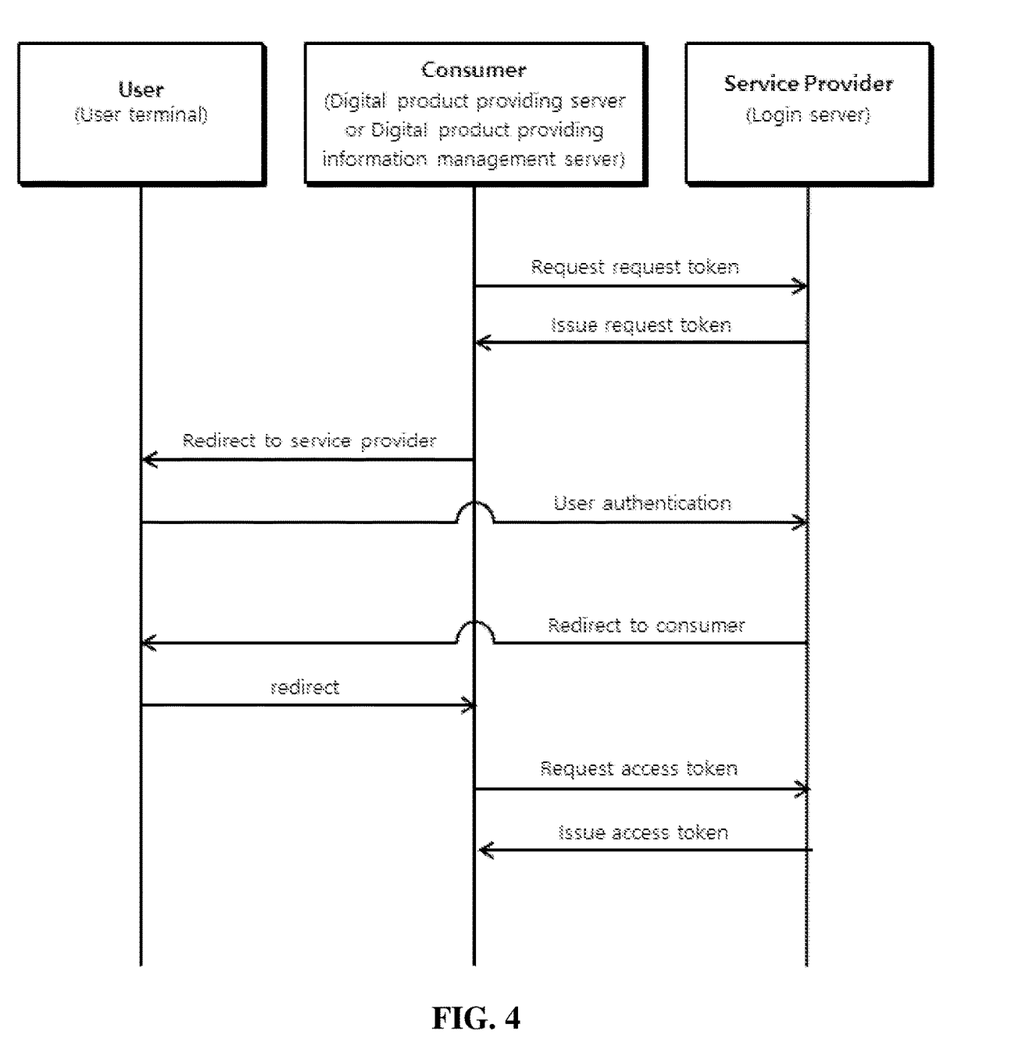
FIG. 4 is a sequence diagram illustrating the authentication process flow of OAuth.

The digital product providing information management server 110 logs into the login server 140 to identify the user and obtains a user identifier (step 320). At this point, since the user terminal 130 provides the login server 140 with login information, the login process is accomplished through communication among the three parties of the user terminal 130, the digital product providing information management server 110 and the login server 140. Since such a login process of the login service is a technique already-known in the art and detailed description thereof may unnecessarily obscure the gist of the present invention, it will not be described in detail. As an example of the login process of the login service, OAuth, which is an open standard authentication method, performs authentication through the process as shown in FIG. 4.

Referring to FIG. 3 again, the user identifier provided by the login server 140 at step 320 generally varies according to a service which requests login although the user is the same. That is, a server which requests login provides the login server with a service identifier (e.g., AppID of Facebook or Consumer key of Tweeter) indicating its own service when the server requests login, and since different servers use different service identifiers, a different user identifier is obtained although the user is the same. Accordingly, a user account cannot be synchronized using a login service between the servers providing different services.

However, in the present invention, user account synchronization is pursued as the servers providing different services use the same service identifier. For example, a digital product providing information manager registers its own digital product providing information management service into the login server, receives a service identifier (generally, also receives a password of the service identifier), and provides a digital product provider with the service identifier. Then, the digital product provider uses the login service using the service identifier received from the digital product providing information manager, without separately registering its own digital product providing service in the login server. That is, in the present invention, since different services use the same service identifier, user account synchronization is accomplished by obtaining the same user identifier for the same user from the login server.

Since the service identifier provided to the login server is not used to actually identify a service in the present invention, this will be referred to as an 'application identifier' to avoid confusion. Here, the 'application' may be understood as representing the entire digital product providing system according to the present invention. In the present invention, each server may use a separate service identifier, other than the unique 'application identifier' used when the server logs into the login server, to actually distinguish its own service. Meanwhile, each server may internally manage a separate user identifier other than the user identifier provided by the login server 140, and the former is referred to as a 'local user identifier', and the latter is referred to as a 'login server user identifier'.

In summary, the digital product providing information management server 110 logs into the login server 140 using a unique application identifier and obtains a login server user identifier of the user for the unique application identifier from the login server 140 (step 320). The digital product providing information management server 110 obtaining the login server user identifier stores digital product providing information based on the request for providing a digital product of the digital product providing server 120 received from the user terminal 130 into the database in association with the login server user identifier (step 330).

Meanwhile, the user transmits an account synchronization request to the digital product providing server 120 through the user terminal 130 to actually receive a digital product from the digital product providing server 120 which provides digital products (step 340). The digital product providing server 120 receiving the account synchronization request logs into the login server using an application identifier the same as the identifier used by the digital product providing information management server 110 to identify the user and obtains a login server user identifier (step 350). At this point, the login process is accomplished through communication among the three parties of the user terminal 130, the digital product providing server 120 and the login server 140 as described above.

Since the digital product providing information management server 110 and the digital product providing server 120 have the same login server user identifier for the same user through the process described above, if the digital product providing information management server 110 transmits the digital product providing information to the digital product providing server 120 in association with the login server user identifier (step 360), the digital product providing server 120 may provide the corresponding user with a digital product.

There may be various embodiments in the method of transmitting digital product providing information in association with the login server user identifier. As a first embodiment, the digital product providing information management server 110 may transmit the digital product providing information to the digital product providing server 120 together with the login server user identifier. As a second embodiment, the digital product providing server 120 transmits a digital product providing information request including the login server user identifier to the digital product providing information management server 110, and the digital product providing information management server 110 may search for digital product providing information related to the login server user identifier included in the received digital product providing information request from the database and transmit the digital product providing information to the digital product providing server 120. The digital product providing server 120 may include an identifier of its own service in the digital product providing information request and transmits the digital product providing information request.

According to embodiments, the digital product providing information may be transmitted in association with the login server user identifier between the digital product providing information management server 110 and the digital product providing server 120 using a local user identifier instead of the login server user identifier. For example, as the digital product providing server 120 transmits the login server user identifier and its own internal user identifier corresponding thereto to the digital product providing information management server 110, the digital product providing information management server 110 may know the internal user identifier of the digital product providing server 120 for each login server user identifier. In this case, the internal user identifier of the digital product providing server 120 may be used in substitution for the login server user identifier transmitted between the servers in the first and second embodiments.

Similarly, as the digital product providing information management server 110 transmits the login server user identifier and its own internal user identifier corresponding thereto to the digital product providing server 120, the digital product providing server 120 may know the internal user identifier of the digital product providing information management server 110 for each login server user identifier. In this case, the internal user identifier of the digital product providing information management server 110 may be used in substitution for the login server user identifier transmitted between the servers in the first and second embodiments.

In addition, the steps 310 to 360 are not necessarily performed in order, and there may be various scenarios in the method of performing the steps. For example, if the user first requests the digital product providing information management server 110 to provide a digital product of the digital product providing server 120 before requesting the digital product providing server 120 to synchronize an account, the digital product providing information management server 110 may store digital product providing information in the database and transmit the digital product providing information to the digital product providing server 120 later when it is notified of the account synchronization from the digital product providing server 120 after the user requests the digital product providing server 120 to synchronize an account.

If the account is synchronized between the digital product providing information management server 110 and the digital product providing server 120, the digital product providing information management server 110 may transmit the digital product providing information to the digital product providing server 120 whenever corresponding digital product providing information is generated or transmit corresponding digital product providing information whenever the digital product providing server 120 requests.

The digital product providing information management server 110 may transmit digital product providing information corresponding to a service of the digital product providing server 120 in advance before the digital product providing server 120 logs into the login service. The digital product providing server 120 may store the digital product providing information and provide the user with a digital product according to the stored digital product providing information when the user requests account synchronization later.

If the user requests the digital product providing server 120 to synchronize an account first, the digital product providing information management server 110 may be notified of information on the account synchronization, i.e., the fact that a user corresponding to a specific login server user identifier has requested account synchronization or the internal user identifier of the digital product providing server 120 corresponding to the specific login server user identifier, from the digital product providing server 120, and transmit a digital product providing request to the digital product providing server 120 when the user requests to provide a digital product later. Although the user requests the digital product providing server 120 to synchronize an account first, the digital product providing information management server 110 may transmit digital product providing information corresponding to the service of the digital product providing server 120 without notification of account synchronization from the digital product providing server 120.

The digital product providing information management server 110 may transmit the digital product providing information to the digital product providing server 120 one piece at a time or a plurality of pieces at a time for a specific user or a plurality of users. The digital product providing information management server 110 may transmit the digital product providing information without the request of the digital product providing server 120 or transmit the digital product providing information in response to the request of the digital product providing server 120.

The digital product providing server 120 receiving the digital product providing information performs a process of providing the digital product to the user according to the received digital product providing information (step 370). If the digital product is a type that is provided to the terminal of the user, the digital product providing server 120 provides the user terminal 130 with the digital product (step 380).

The user account synchronization method like this is particularly useful when different servers (i.e., the different services) are operated by different companies, since the user account information does not need to be shared among the companies. In other words, although the digital product providing information management server 110 and the digital product providing server 120 are servers operated by different companies, a user account can be synchronized very conveniently.

Figure 5:
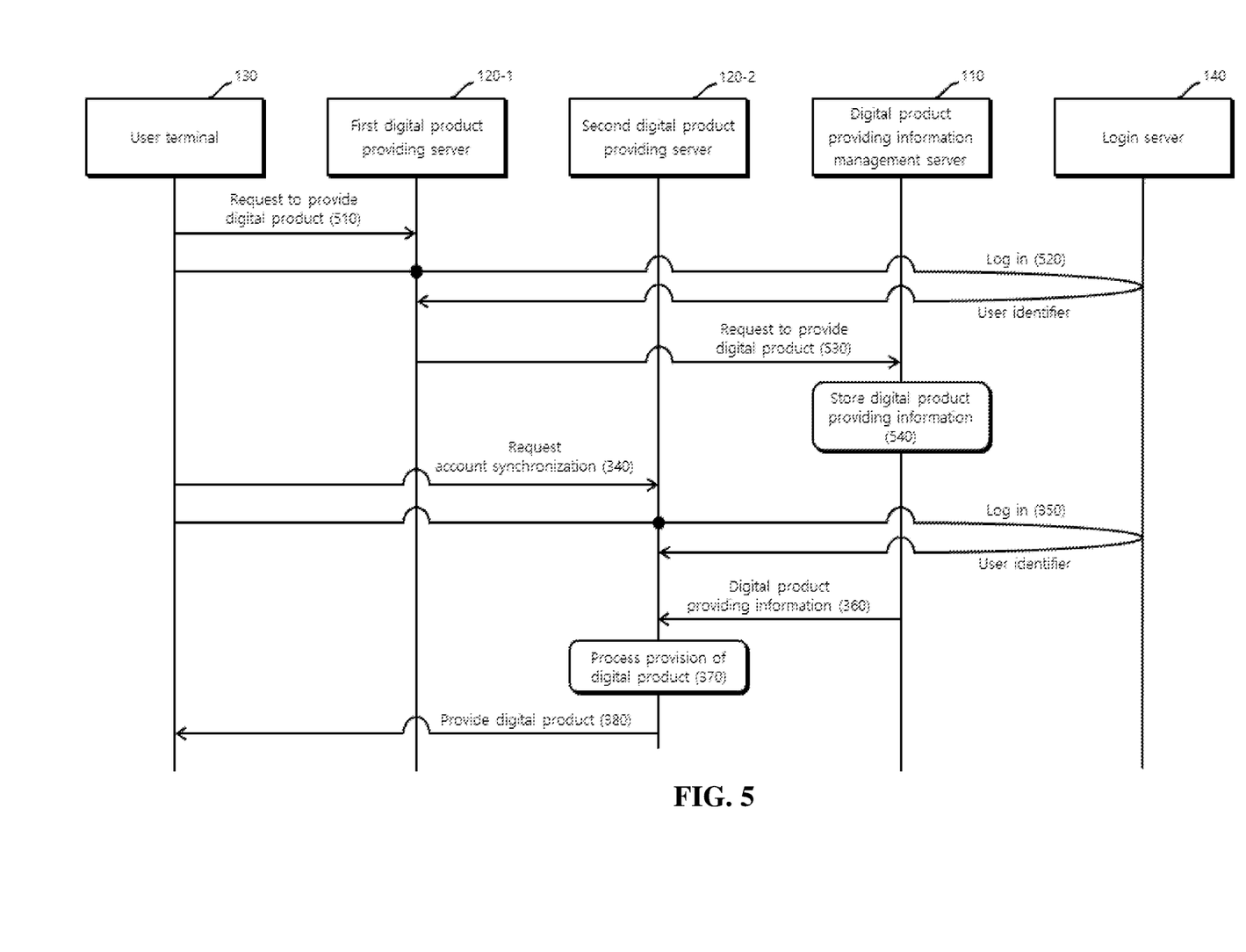
FIG. 5 is a sequence diagram illustrating the flow of a digital product providing method according to another embodiment of the present invention.

FIG. 5 is a sequence diagram illustrating the flow of a digital product providing method according to another embodiment of the present invention, which shows a method of providing a digital product through user account synchronization between different digital product providing servers 120-1 and 120-2. Referring to FIG. 5, a user transmits a request for providing a digital product of the second digital product providing server 120-2 to the first digital product providing server 120-1 through the user terminal 130 (step 510). Here, the request for providing a digital product of the second digital product providing server 120-2 may be a direct request for providing a specific digital product of the second digital product providing server 120-2 or information corresponding to provision of the specific digital product of the second digital product providing server 120-2. The first digital product providing server 120-1 performs a function of transmitting a digital product providing request to the digital product providing information management server 110 in response to the request of the user, and the digital product providing information management server 110 performs a function of providing the second digital product providing server 120-2 with the digital product providing information in a way similar to the embodiment of FIG. 3.

The first digital product providing server 120-1 receiving the digital product providing request logs into the login server 140 using a unique application identifier and obtains a login server user identifier of the user for the unique application identifier from the login server 140 to identify the user (step 510).

Also in this embodiment, although the first digital product providing server 120-1 and the second digital product providing server 120-2 perform different services, they synchronize the user account using the same application identifier when they log into the login server 140. Although the digital product providing information management server 110 may log into the login server 140 using the same application identifier and receive and use the login server user identifier for synchronization, since the digital product providing information management server 110 may receive login server user identifiers from the first digital product providing server 120-1 and the second digital product providing server 120-2 and match the same login server user identifiers or transfer a login server user identifier received from any one of the digital product providing servers to the other digital product providing server, login into the login server 140 is not always necessary. However, since a digital product providing information manager may register its own digital product providing information management service in the login server and receive and provide a service identifier to the first digital product provider and the second digital product provider, the first digital product providing server 120-1 and the second digital product providing server 120-2 may use the same application identifier.

The first digital product providing server 120-1 obtaining the login server user identifier transmits a request for providing a digital product of the second digital product providing server 120-2 to the digital product providing information management server 110 in association with the login server user identifier. The method of transmitting a request for providing a digital product in association with the login server user identifier is similar to the method described in the embodiment of FIG. 3. The first digital product providing server 120-1 may transmit the request for providing a digital product to the digital product providing information management server 110 together with the login server user identifier or transmit the request for providing a digital product to the digital product providing information management server 110 together with a local user identifier corresponding to the login server user identifier. Here, the local user identifier is an identifier shared by the first digital product providing server 120-1 and the digital product providing information management server 110 in advance by communicating with each other, and it may be an internal user identifier of the first digital product providing server 120-1 or an internal user identifier of the digital product providing information management server 110.

The digital product providing information management server 110 stores digital product providing information based on the request for providing a digital product of the second digital product providing server received from the first digital product providing server in the database in association with the login server user identifier (step 540).

The user transmits an account synchronization request to the second digital product providing server 120-2 through the user terminal 130 to receive a digital product from the second digital product providing server 120-2, and since the steps performed thereafter are the same as the steps 340 to 380 described in the embodiment of FIG. 3, description thereof is omitted.

The user account synchronization method like this is particularly useful when different digital product providing servers 120-1 and 120-2 are operated by different companies, since the user account information does not need to be shared between the companies. In addition, since the first digital product providing server 120-1 and the second digital product providing server 120-2 do not directly communicate with each other and communicate with only the digital product providing information management server 110 respectively, different digital product providers do not need to develop a user account synchronization system together. That is, if it were not for the present invention, when a first digital product provider desires to synchronize the user account with a second digital product provider, a third digital product provider, a fourth digital product provider or the like for a cross promotion, the first digital product provider may suffer from the burden and inconvenience of contacting with each company and discussing and developing a new account synchronization system every time by the developers of both sides. Therefore, a method of providing a digital product of another service provider using a coupon code, not an account synchronization method, is widely used for cross promotion in the prior art.

However, according to the present invention, if a digital product provider constructs an account synchronization system together with a digital product providing information manager, a user account can be synchronized between the digital product provider and the other digital product providers almost without the burden of additional development. If the digital product providing information manager provides a URL coupon type system disclosed in Korean Patent Application No. 2015-0008739 applied by the inventor of the present invention, digital product providers may give and receive digital products to and from each other through the present invention without any burden of development.

The example structures of the present invention may be implemented in various methods including program commands executed by a processor, a software module, a microcode, a computer program product recorded in a computer-readable recording medium (the computer includes all devices having an information processing function), a logic circuit, an application specific integrated circuit (ASIC), firmware and the like. Examples of the computer-readable recording medium are ROM, RAM, CD, DVD, a magnetic tape, a hard dick, a floppy disk, an optical data storage device and the like, and, in addition, a medium implemented in the form of a carrier wave (e.g., transmission through the Internet) is also included. In addition, the computer-readable recording medium may be distributed in computer systems connected through a network, and a code that can be read by a computer in a distributed manner can be stored and executed therein.

The present invention has been described focusing on the preferred embodiments shown in the drawings. These embodiments are not intended to limit the present invention, but merely for illustrative purposes, and should be considered from an illustrative viewpoint, not a restrictive viewpoint. The true scope of the present invention should be defined by the technical spirit of the appended claims, not the above description. Although specific terms have been used herein, they have been used merely for the purpose of describing the concept of the present invention, and have not been used to limit the meanings thereof and the scope of the present invention set forth in the claims. Therefore, it will be understood by those having ordinary knowledge in the art that various modified forms and equivalent other embodiments can be made without departing from the intrinsic spirit of the present invention claimed in the claims. It should be understood that the equivalents include equivalents that will be developed in the future, i.e., all components invented to perform the same function regardless of the structure, as well as currently publicized equivalents.

The invention claimed is:

1. A digital product providing method performed by a terminal of a user, a digital product providing information management server (DPPIMS), and a digital product providing server (DPPS), the terminal of the user being configured for enabling the user to login and to request a digital product, the DPPIMS being configured for managing information for providing the user with a digital product, and the DPPS being configured for directly providing the user with the digital product, wherein a digital product providing information management service provided by the DPPIMS has been pre-registered with a login server, and a predefined service identifier of the DPPIMS, that has been assigned by the login server and indicates registration of the digital product providing information management service with the login server, has been pre-stored in the DPPIMS and the DPPS, the method comprising:

receiving, by the DPPIMS, a request issued from the terminal of the user for providing the digital product of the digital product providing server;

logging, by the DPPIMS, into the login server using the predefined service identifier, wherein the logging, by the DPPIMS, into the login server using the predefined service identifier includes:
  redirecting, by the DPPIMS, the terminal of the user to the login server,
  providing, by the terminal of the user, login information of the user to the login server, and
  receiving, by the DPPIMS, a first access token from the login server;

requesting, by the DPPIMS, a login server user identifier of the user for the predefined service identifier, assigned by the login server, from the login server, and obtaining, by the DPPIMS, the login server user identifier from the login server;

storing, by the DPPIMS, digital product providing information in association with the login server user identifier, which indicates that the user associated to the login server user identifier has requested the digital product, in a database in response to the request for providing the digital product of the DPPS;

receiving, by the DPPS, a request for account synchronization from the terminal of the user;

logging, by the DPPS, into the login server using the predefined service identifier of the DPPIMS in response to the request for account synchronization, wherein the logging, by the DPPS, into the login server using the predefined service identifier includes:
  redirecting, by the DPPS, the terminal of the user to the login server, and
  providing, by the terminal of the user, the login information of the user to the login server;

requesting, by the DPPS, the login server user identifier of the user for the predefined service identifier, from the login server, and obtaining, by the DPPS, the login server user identifier from the login server;

transmitting, by the DPPIMS, the digital product providing information that is associated with the login server user identifier, which indicates that the user associated to the login server user identifier has requested the digital product, to the DPPS; and providing, by the DPPS, the requested digital product to the user based on the login server user identifier, according to the digital product providing information associated with the login server user identifier.

2. The method according to claim 1, wherein the transmitting the digital product providing information includes transmitting the digital product providing information to the DPPS together with the login server user identifier.

3. The method according to claim 1, wherein the transmitting the digital product providing information includes:
  receiving, by the DPPIMS, a digital product providing information request from the DPPS, wherein the digital product providing information request includes the login server user identifier; and searching, by the DPPIMS, for digital product providing information related to the login server user identifier from the database and transmitting, by the DPPIMS, the digital product providing information to the DPPS.

4. The method according to claim 3, wherein the digital product providing information request includes an identifier for a service of the DPPS.

5. The method according to claim 1, wherein the DPPIMS and the DPPS are operated by different companies.

6. A digital product providing system including a terminal of a user, a digital product providing information management server (DPPIMS), and a digital product providing server (DPPS), the terminal of the user being configured for enabling the user to login and to request a digital product, the DPPIMS being configured for managing information for providing the user with a digital product, and the DPPS being configured for directly providing the user with the digital product, wherein a digital product providing information management service provided by the DPPIMS has been pre-registered with a login server, and a predefined service identifier of the DPPIMS, that has been assigned by the login server and indicates registration of the digital product providing information management service with the login server, has been pre-stored in the DPPIMS and the DPPS, the system comprising one or more processors configured for:

receiving, by the DPPIMS, a request issued from the terminal of the user for providing the digital product of the digital product providing server;

logging, by the DPPIMS, into the login server using the predefined service identifier, wherein the logging, by the DPPIMS, into the login server using the predefined service identifier includes:

redirecting, by the DPPIMS, the terminal of the user to the login server, providing, by the terminal of the user, login information of the user to the login server, and receiving, by the DPPIMS, a first access token from the login server;

requesting, by the DPPIMS, a login server user identifier of the user for the predefined service identifier, assigned by the login server, from the login server, and obtaining, by the DPPIMS, the login server user identifier from the login server;

storing, by the DPPIMS, digital product providing information in association with the login server user identifier, which indicates that the user associated to the login server user identifier has requested the digital product, in a database in response to the request for providing the digital product of the DPPS;

receiving, by the DPPS, a request for account synchronization from the terminal of the user;

logging, by the DPPS, into the login server using the predefined service identifier of the DPPIMS in response to the request for account synchronization, wherein the logging, by the DPPS, into the login server using the predefined service identifier includes:

redirecting, by the DPPS, the terminal of the user to the login server, and providing, by the terminal of the user, the login information of the user to the login server;

requesting, by the DPPS, the login server user identifier of the user for the predefined service identifier, from the login server, and obtaining, by the DPPS, the login server user identifier from the login server;

transmitting, by the DPPIMS, the digital product providing information that is associated with the login server user identifier, which indicates that the user associated to the login server user identifier has requested the digital product, to the DPPS; and providing, by the DPPS, the requested digital product to the user based on the login server user identifier, according to the digital product providing information associated with the login server user identifier.

* * * * *